Oct. 25, 1955

F. H. HANLEY 2,721,894

TELEGRAPH LOOP LOADING

Filed June 7, 1954

INVENTOR
F. H. HANLEY
BY John E Cassidy
ATTORNEY 2,721,894

TELEGRAPH LOOP LOADING

Frank Harold Hanley, Butler, N. J., assignor to American Telephone and Telegraph Company, a corporation of New York Application June 7, 1954, Serial No. 434,852

4 Claims. (Cl. 178—69)

This invention relates to telegraph systems and more particularly to an improvement in a direct-current telegraph line circuit to minimize the effect of a difficulty inherent in the operation of such circuits. Specifically the invention is a circuit feature presently incorporated in a direct-current subscriber telegraph loop circuit for minimizing the marking bias inherent in the operation of such circuits.

An object of the invention is the improvement of telegraph circuits.

A more particular object of the invention is minimizing the marking bias inherent in the operation of certain direct-current telegraph circuits.

In the operation of certain direct-current telegraph circuits, there is an inherent marking bias, by which is meant a lengthening of the marking signal elements and a consequent shortening of the spacing signal elements, particularly on long loops having large distributed capacitance, which marking bias tends to limit the length of the circuit over which the telegraph signals may be transmitted satisfactorily. The reason for this will be made clear hereinafter.

There are presently known in the art a number of arrangements which have been applied to direct-current telegaph circuits in an effort to correct this condition. While these arrangements generally achieve their objective in reducing marking bias, each of them leaves something to be desired as an ideal solution in that it is either relatively expensive or has been found to introduce other difficulties. The present invention will practically eliminate the marking bias and appears economically feasible as the expense of its application is more than compensated in that it materially extends the length of circuit over which satisfactory signals may be transmitted before the introduction of a telegraph repeater is required. This, in one application of the invention, increases significantly the length of a subscriber loop, which may be satisfactorily connected to a central telegraph switching office in a teletypewriter switching system without the need of a repeater intermediate the subscriber premises and the central office. On very long subscriber loops it reduces the number of repeaters required by making it possible to lengthen the distance between them.

The invention may be understood from the following description when read with reference to the associated drawings, which taken together disclose a preferred embodiment in which the invention is presently incorporated. It is to be understood, however, that the invention may be incorporated in other embodiments which will be readily suggested to those skilled in the art from a consideration of the present disclosure.

In the following description the stated magnitudes of constants, such as the values of currents, are by way of example and are not to be considered limitations.

Figure 1:
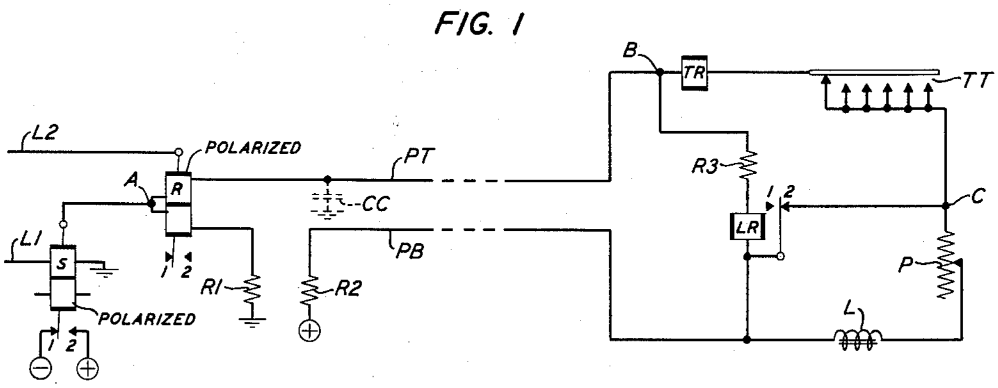
Fig. 1 shows a direct-current telegraph circuit comprising a repeater, shown at the left, connected through a telegraph loop to a subscriber station circuit, shown at the right, which subscriber station circuit includes the arrangement of the present invention.

Refer now to Fig. 1. In Fig. 1 there is shown a direct-current telegraph circuit comprising a telegraph repeater connected by a telegraph loop to a subscriber teletypewriter station. The telegraph repeater is assumed to be located at a central office and is shown at the left in the figure. The subscriber teletypewriter circuit is shown at the right in the figure and the loop comprises two conductors, the upper loop conductor PT and the lower conductor PB. The loop circuit is assumed to be long and to have large distributed capacitance to ground, which is indicated by the single dotted condenser CC, connected between the loop conductor PT and ground.

The circuit is shown in the condition which it assumes in response to a marking signal element, which is the same condition assumed by the circuit when it is interconnected, as shown, but idle. For this condition the armature of sending relay S, which sends to the subscriber station, will be actuated to engage with its contact 1 under the influence of current applied to conductor L1. Each small circle in Fig. 1 represents a connection to battery of the polarity indicated within the circle and having the opposite terminal of the battery grounded. A circuit may then be traced from grounded negative battery through contact 1 and the armature of relay S to the apex A where parallel branches are formed. The upper branch extends through the top winding of receiving relay R and conductor PT to junction B where parallel branches are again formed. One branch extends through the winding of teletypewriter receiving magnet TR and contacts of the teletypewriter transmitter TT to the junction C of parallel branches, one of which extends through contact 2 of relay LR, bottom loop conductor PB and resistor R2 to grounded positive battery. To return to apex A, the second of the parallel branches, formed at this point, extends through the bottom winding of relay R and resistor R1 to ground. From junction B, the second of the parallel branches extends through resistor R3 and the winding of relay LR to conductor PB. From junction C, the second of the parallel branches extends through potentiometer P and inductance L to conductor PB.

With the circuit in this condition, that is to say, with relay LR released as shown, its armature is mechanically biased to engage its contact 2, and the potentiometer P and inductance L are short-circuited. Further, for the marking condition the contacts of the teletypewriter transmitter TT are closed. The resistance of the teletypewriter receiving magnet TR is very low relative to the resistance of the resistor R3 and the winding of relay LR, so that for the marking condition the branch extending through the winding of the teletypewriter receiving magnet TR and the contacts of the teletypewriter transmitter TT effectively shunt the branch through resistor R3 and the winding of relay LR. For the marking condition, therefore, at the teletypewriter station, a low resistance path is available from junction B through the winding of the teletypewriter receiving magnet TR, the contacts of the teletypewriter transmitter TT and contact 2 of relay LR to the bottom loop conductor PB. It will be observed that for this marking condition negative battery is connected through contact 1 of relay S to one end of the loop and positive battery is connected through the lower terminal of resistor R2 to the other end of the loop. For this condition, therefore, the fullmarking current will flow through the top winding of relay R. Its effect will tend to actuate the armature of relay R to engage with its marking contact 1, as shown. This effect will be dominant over the countereffect of current flowing from apex A through the bottom winding of relay R and resistor R1 to ground which is tending to actuate the armature of relay R to engage with its right-hand or spacing contact 2. The effect of the current flowing through the winding of the teletypewriter receiving magnet TR, at the subscriber's station, will cause the teletypewriter receiver to be actuated to its marking condition. The small amount of current flowing through the winding of relay LR will be ineffective to overcome the mechanical bias of the armature relay LR so that its armature will remain in engagement with its contact 2, as shown. When a spacing signal is received over conductor L1 the armature of relay S will be actuated to engage with its spacing contact 2. This will replace the grounded negative battery, heretofore connected to the upper loop conductor PT, with grounded positive battery, so that positive battery will be connected to both ends of the loop, as a consequence of which no current will flow through the top winding of relay R or through the winding of teletypewriter receiving magnet TR. The substitution of positive battery for negative battery will reverse the effect of the current flowing in the bottom winding of relay R and its armature will therefore be maintained in its marking condition, as shown, since there will be no opposing effect in the top winding of relay R. When no current flows through the winding of the teletypewriter receiving magnet TR a spacing signal will be recorded in the teletypewriter receiver.

In transmitting from the subscriber station toward the central office, during the idle or marking condition, the circuit will be as described for the marking condition in the foregoing. To transmit a spacing signal from the teletypewriter station the transmitting contacts TT are opened. This will reduce the current in the top winding of relay R and its armature will be actuated to engage its spacing contact 2 under the influence of the current in the bottom winding of relay R, which in this instance continues to be maintained in a direction to actuate the armature of relay R toward its spacing contact. A spacing signal will therefore be transmitted from contact 2 of relay R over conductor L2.

When the contacts of the teletypewriter transmitter TT are opened to transmit a spacing signal to the distant office the shunt around the winding of relay LR and resistor R3 is removed and sufficient current is permitted to flow through this branch to actuate the armature of relay LR to engage its contact 1. The current through the winding of relay LR is established at the minimum necessary to permit satisfactory operation of relay LR, which relay is preferably arranged to be responsive to current of relatively low magnitude. When contact 2 is opened, the shunt around the inductance L and the potentiometer P is removed and, when the contacts of the teletypewriter transmitter TT are reclosed to transmit the next succeeding marking signal element, the inductance L and the potentiometer P will be connected in series with the loop for a short interval until relay LR releases. The interval may be adjusted by a choice of constants of the inductance L, resistor R3, winding of relay LR and the setting of potentiometer P. As will appear from the following description of the diagrams, the introduction of the inductance L into the loop circuit, on transitions from spacing to marking, delays the build-up of the loop current at such times, thus compensating for the inherent marking bias in the loop circuit. The introduction of the inductance L serves a second purpose in that it ensures that relay LR will not release for an interval long enough to permit the inductance L to be effective in removing the bias.

It has been stated in the foregoing that an object of the invention is to minimize the marking bias inherent in the operation of certain direct-current telegraph circuits. It is generally well known in the art that the direct-current telegraph loop circuits, such as that shown in Fig. 1, which do not include the arrangement of the present invention, that is to say which do not include the inductance L, potentiometer P, relay LR, resistor R3 and the associated wiring which incorporates them into the station circuit, have an inherent marking bias or, characteristic lengthening of a marking signal element and shortening of a spacing signal element. This may be understood from reference to Fig. 2 and the following.

Figure 2:
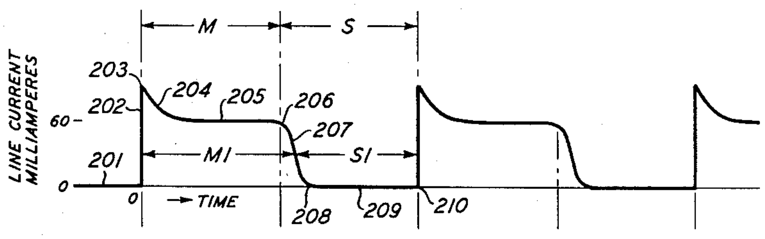
Fig. 2 is a diagram of the loop current versus time characteristic for a subscriber teletypewriter loop circuit which is not equipped with the present invention.

Fig. 2 is a diagram showing the shape of alternate marking and spacing signal elements which are produced in the loop as a result of closing and opening the contacts of the teletypewriter transmitter TT when the arrangement of the present invention is not included in the station circuit. In Fig. 2 the abscissa represents time and the ordinate represents loop current. Line 201 which represents zero current shows the condition of the loop at the termination of the last preceding spacing signal prior to the transmission of a marking and spacing signal element to be generated by contacts TT. When contacts TT are closed at the beginning of a marking signal element, which will be considered the zero time instant, the current rises almost instantaneously, as indicated by line 202, to a peak 203, overshooting the normal full marking current which will be considered to be 60 milliamperes. From the peak 203 the current subsides, as indicated along line 204, to the normal 60-milliampere level, represented by line 205, which is maintained to the end of the marking signal element represented by 206. When the contacts of the teletypewriter transmitter TT are opened to transmit a spacing signal element, the current does not fall to its ultimate zero value instantly but as indicated by line 207. The current reaches the zero level at point 208 and remains at this level, as indicated by line 209, for the remainder of the duration of the spacing signal element which is indicated at point 210.

It is assumed in the present instance that the duration of a normal marking signal element is equal to the duration of a normal spacing signal element. This is indicated by the normal intervals of the elements as shown by the intervals M and S for mark and space, respectively, in the upper portion of Fig. 2. The effect of the distorted signal form shown in Fig. 2 is to lengthen the marking signal interval, as indicated by M1, and to shorten the spacing signal interval, as indicated by S1 in Fig. 2.

The distortion of the signal elements will manifest itself in the operation of the receiving relay R at the central station. The current in the lower or biasing winding of relay R, while the teletypewriter transmitter TT is sending for both marking and spacing, is equal to half of the magnitude of the normal marking current in the upper or line winding of relay R. In this case, for the value 60 milliamperes assumed for the marking condition in the line winding of relay R, the current in the bottom or biasing winding of relay R would be 30 milliamperes. When the current in the line winding of relay R at the start of the marking interval, as indicated by line 202, rises almost instantaneously to the peak indicated by 203, the armature of relay R will be actuated almost instantaneously to engage with its marking contact as the current passes through 30 milliamperes along the line 202. Since at the start of the spacing signal interval the current in the top winding of relay R does not fall instantaneously through the 30-milliampere level to the zero level, but is delayed by the discharge of the capacitance of the circuit, as indicated by line 207, the armature of relay R is not actuated to engage its spacing contact immediately. It cannot do this until the current in the line winding has fallen to the 30-milliampere level. Thus the transition will be delayed and the marking signal will be lengthened as shown by a comparison of the length of time intervals M1 and M, the duration of the spacing signal element being shortened correspondingly as shown by a comparison of time intervals S1 and S.

Reference to Fig. 2 shows that the difficulty is caused by the almost instantaneous transition from a spacing to a marking condition of the armature of relay R and a delayed transition of the armature of relay R from marking to spacing. The present invention tends to equalize these transitions and how this is effected will now be explained with reference to the diagram per Fig. 3. For purpose of simplification, the few milliamperes current which flows through the resistor R3 and the winding of relay LR during the spacing interval will not be considered in the discussion of Fig. 3.

In describing the operation of the circuit per Fig. 1 it was shown that relay LR is operated when the contacts of the teletypewriter transmitter TT are opened to transmit a spacing signal element. When these contacts are reclosed to transmit a marking signal element, the inductance L and the potentiometer P are effectively in circuit for an interval until contact 2 of relay LR recloses and the inductance and potentiometer are effective to delay the build-up of the current on the spacing-to-marking transition which transition is now delayed, as indicated by line 303, in Fig. 3.

Figure 3:
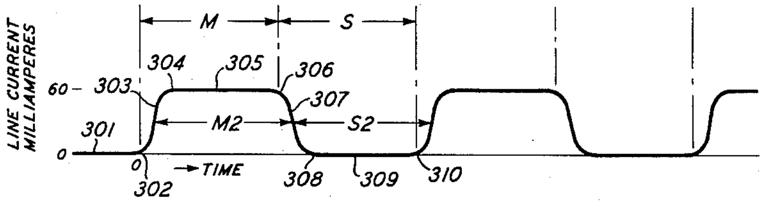
Fig. 3 is a diagram of the loop current versus time characteristic for a subscriber teletypewriter loop circuit in which the present invention is incorporated.

In Fig. 3 it is assumed that the current at the end of the last preceding spacing interval is as indicated by line 301. At the beginning of the marking signal interval, indicated by 302, the current rises, as indicated by line 303, to the 60-milliampere level at 304. This level is maintained, as indicated by line 305, until the beginning of the next spacing signal interval at 306. The current then falls as indicated along line 307 to 308 at which level it is maintained, as indicated by line 309, until the beginning of the next marking signal interval at 310.

It will be observed, from a comparison of line 303 in Fig. 3 and line 202 in Fig. 2, that line 303 in Fig. 3, does not rise almost instantaneously, as does line 202 in Fig. 2, and overshoot to a peak, as indicated by 203. The build-up on a space-to-mark transition in Fig. 3, is delayed, as indicated by line 303, and furthermore there is no overshooting. The greater current indicated by the overshooting in Fig. 2 tends to increase the marking bias by actuating the armature faster on the space-to-mark transition than on the opposite transition in which the current is smaller. But this effect is not so great as that due to the difference in the rates of rise and of decay of current on the transitions in Fig. 2.

It should be apparent from the foregoing, that the closing of the contacts of the teletypewriter transmitter TT reduces the current through the winding of relay LR permitting it to release. The closing of contact 2 of relay LR short-circuits the inductance L and potentiometer P, so that on the following transition, that is on a transition from marking to spacing, the inductance L and potentiometer P are effectively out of circuit. They do not therefore have any effect on the marking-to-spacing transition. This transition is now, as indicated by line 307, and is essentially the same as for the corresponding transition in Fig. 2 indicated by line 207.

The marking interval in Fig. 3 is indicated by M2 and the spacing interval by S2 which are each substantially equal and equal to normal marking and spacing intervals, respectively, as shown by M and S in Fig. 2.

Attention has been called to the fact that the connection of resistor R3 and the winding of relay LR across the loop conductors at the subscriber station will have the effect of shunting the contacts of teletypewriter transmitting contacts TT, when they are opened for the transmission of a spacing signal, at which time the current in loop circuits arranged as formerly, without the present invention, falls to zero while in the present arrangement a few milliamperes will flow for the steady state spacing condition. However, the current will not materially affect operation and can be compensated by an adjustment of the biasing current in relay R.

In practice the inductance L may be tapped to afford inductance of from 1 to 6 henries and the potentiometer may have a maximum resistance of 1,000 ohms to care for loops ranging up to 30 miles of 16 to 30 gauge copper wire.

What is claimed is:

1. In a direct-current telegraph system, a telegraph circuit having an inductance in series with a telegraph line, a relay having a winding connected to said line, contacts on said relay shunting said inductance, a telegraph transmitter in said circuit, said relay energized responsive to the actuation of said transmitter, said contacts opened responsive to said energization to introduce said inductance in series in said line on a signal transition to minimize bias.

2. In a direct-current telegraph system, a telegraph loop, telegraph transmitting contacts and an inductance in series in said loop, a relay having a winding connected across said loop, said relay having contacts shunting said inductance in response to a first signaling condition of said transmitting contacts, and means for opening said relay contacts in response to a second signaling condition of said transmitting contacts, to minimize bias.

3. In a direct-current telegraph system, a telegraph loop circuit comprising in series the winding of a telegraph receiving element, the contacts of a telegraph transmitting element and a lumped inductance, a shunt around said inductance, and a control for said shunt responsive to the actuation of said contacts.

4. A direct-current telegraph system having a central telegraph repeater circuit, a subscriber telegraph station circuit, a telegraph loop circuit interconnecting said circuits, said station circuit comprising a telegraph transmitting contact, means in said station circuit for eliminating marking bias normally inherent in said system, said means comprising an inductance connected in said station circuit in series with said loop, a relay having a winding connected across said loop in said station circuit, contacts on said relay effectively shunting said inductance in response to a first signaling condition of said transmitting contact, means responsive to a second signaling condition of said transmitting contact for energizing said winding so as to open said relay contact and remove said shunt.

References Cited in the file of this patent

UNITED STATES PATENTS 2,246,064 Rea ---------------- June 17, 1941